US008684264B2

(12) United States Patent
Yu et al.

(10) Patent No.: US 8,684,264 B2
(45) Date of Patent: Apr. 1, 2014

(54) MOBILE COMMUNICATION DEVICE AND DATA VERIFICATION SYSTEM COMPRISING SMART CARD HAVING DOUBLE CHIPS

(75) Inventors: Joshua Yu, New Taipei (TW);
Pao-Chieh An, Taipei (TW);
Chih-Hung Kuo, Taipei (TW);
Meng-Tsung Liu, Taoyuan County (TW)

(73) Assignee: Abancast Limited (VG)

( * ) Notice: Subject to any disclaimer, the term of this patent is extended or adjusted under 35 U.S.C. 154(b) by 125 days.

(21) Appl. No.: 13/223,371

(22) Filed: Sep. 1, 2011

(65) Prior Publication Data

US 2012/0292390 A1 Nov. 22, 2012

(30) Foreign Application Priority Data

May 20, 2011 (TW) .............................. 100117853 A

(51) Int. Cl.
| | |
|---|---|
| *G06K 5/00* | (2006.01) |
| *G06K 7/08* | (2006.01) |
| *G06K 19/00* | (2006.01) |
| *H04M 1/66* | (2006.01) |
| *H04M 1/68* | (2006.01) |
| *H04M 3/16* | (2006.01) |
| *H04M 1/00* | (2006.01) |
| *H04M 1/38* | (2006.01) |
| *G06F 7/04* | (2006.01) |
| *G06Q 40/00* | (2012.01) |
| *G06Q 20/00* | (2012.01) |

(52) U.S. Cl.
USPC ........... 235/380; 235/379; 235/381; 235/382; 235/487; 455/410; 455/411; 455/557; 455/558; 455/556.1; 726/16; 726/20; 705/41; 705/64; 705/65; 705/73

(58) Field of Classification Search
USPC .......... 235/379–382, 487; 455/410, 411, 558, 455/551, 557, 556.1; 726/16, 20; 705/41, 705/64, 65, 73
See application file for complete search history.

(56) References Cited

U.S. PATENT DOCUMENTS

| | | | | |
|---|---|---|---|---|
| 5,915,226 | A | * | 6/1999 | Martineau ..................... 455/558 |
| 6,484,024 | B1 | * | 11/2002 | Darnault et al. ............... 455/418 |
| 7,418,272 | B2 | * | 8/2008 | Son ................................ 455/558 |
| 7,597,250 | B2 | * | 10/2009 | Finn .............................. 235/380 |
| 7,600,675 | B2 | * | 10/2009 | Petralia et al. ................ 235/380 |
| 7,782,176 | B2 | * | 8/2010 | Mitani et al. ................. 340/10.6 |
| 7,991,434 | B2 | * | 8/2011 | Yen et al. ...................... 455/558 |
| 8,086,269 | B2 | * | 12/2011 | Wang ............................ 455/558 |

(Continued)

*Primary Examiner* — Daniel Walsh

(74) *Attorney, Agent, or Firm* — Morris Manning & Martin LLP; Tim Tingkang Xia, Esq.

(57) ABSTRACT

A mobile communication device and a data verification system applying a smart card having double chips are applicable to data verification processing when the mobile communication device drives the smart chip to perform transaction with a front end access device. The mobile communication device includes a wireless communication unit, a processing unit and a smart chip. When the processing unit receives a transaction request sent by the front end access device or the processing unit executes a transaction procedure, the processing unit performs data verification processing during transaction through the smart chip.

2 Claims, 9 Drawing Sheets

(56) References Cited

U.S. PATENT DOCUMENTS

| | | | |
|---|---|---|---|
| 2003/0224766 A1* | 12/2003 | Stockhammer | 455/414.1 |
| 2004/0127256 A1* | 7/2004 | Goldthwaite et al. | 455/558 |
| 2004/0209651 A1* | 10/2004 | Tsukamoto | 455/558 |
| 2005/0197169 A1* | 9/2005 | Son | 455/572 |
| 2006/0058064 A1* | 3/2006 | Satou | 455/558 |
| 2006/0175416 A1* | 8/2006 | Ho | 235/492 |
| 2006/0219776 A1* | 10/2006 | Finn | 235/380 |
| 2006/0279410 A1* | 12/2006 | Mitani et al. | 340/10.6 |
| 2007/0119917 A1* | 5/2007 | Tomikawa et al. | 235/380 |
| 2007/0135164 A1* | 6/2007 | Lee | 455/558 |
| 2007/0213096 A1* | 9/2007 | Bella et al. | 455/558 |
| 2008/0099559 A1* | 5/2008 | Lo et al. | 235/441 |
| 2008/0167988 A1* | 7/2008 | Sun et al. | 705/39 |
| 2008/0302875 A1* | 12/2008 | Chien | 235/492 |
| 2009/0036166 A1* | 2/2009 | Yen et al. | 455/558 |
| 2009/0312054 A1* | 12/2009 | Choi | 455/558 |
| 2010/0069118 A1* | 3/2010 | Wang | 455/558 |
| 2011/0312382 A1* | 12/2011 | Itay et al. | 455/558 |
| 2012/0292390 A1* | 11/2012 | Yu et al. | 235/380 |

* cited by examiner

MOBILE COMMUNICATION DEVICE AND DATA VERIFICATION SYSTEM COMPRISING SMART CARD HAVING DOUBLE CHIPS

CROSS-REFERENCE TO RELATED APPLICATIONS

This non-provisional application claims priority under 35 U.S.C. §119(a) on Patent Application No(s). 100117853 filed in Taiwan, R.O.C. on May 20, 2011, the entire contents of which are hereby incorporated by reference.

BACKGROUND

1. Technical Field

The present disclosure relates to a smart card, a mobile communication device and a data processing system, and more particularly to a mobile communication device and a data verification system comprising a smart card having double chips.

2. Related Art

With the miniaturization of an integrated circuit (IC), industries are driven to achieve a transaction mode that is impracticable before by using electronic products. A smart card is taken as an example. The smart card not only has a specific appearance and material, but is also embedded with a group of IC chips. (or induction coils) The smart card includes a microprocessor, an input/output (I/O) interface and a memory for providing functions of data operation, data access control and data storage. The size and contact definition of smart card is formulated according to ISO7810. A common application of the smart card is a telephone IC card, an identity (ID) IC card, and an automatic teller machine (ATM) card.

People in modern world may carry many smart cards (such as, a digital certificate, a bank ATM card, a credit card and an electronic purse) when traveling. Although a piece of smart card is considered light and thin, carrying many smart cards at the same time still occupies a lot of space. Therefore, in order to solve the problem of carrying and using the smart cards, people try to combine a mobile communication device with a smart card.

The operation of a contactless smart card is to generate electromagnetic conversion by changing the distance between the induction coil and the card reader for driving the integrated circuit chip. Taking the electronic purse as an example, an average person usually removes the IC chip and the induction coil out of a body of the electronic purse when modifying the electronic purse. In the process of disassembling the electronic purse, the induction coil may be cut off, causing the IC chip being not operated successfully. Moreover, if an additional IC chip needs to be installed in the existing mobile communication device (or other electronic products), the internal configuration of the mobile communication device may be destroyed during the process. In this way, the mobile communication device loses the original factory warranty.

In the foregoing example, the transaction processing of the electronic purse is a data rewriting process performed by the card reader deducting money from the electronic purse. Since the financial system at the back end is not directly contacted, the electronic purse may still be operated after being modified. However, for the smart card used in the financial system (for example, the credit card or the ATM card of the bank), if the ID verification information of a user is not notified of in the transaction processing, it may be difficult to protect the personal information during transactions.

SUMMARY

In view of above problems, the present disclosure provides a mobile communication device applicable to data verification process when the mobile communication device drives a smart chip to perform transaction with a front end access device.

The mobile communication device of the present disclosure comprises a smart chip storing ID verification information and a processing unit electrically connected to the smart chip. When the smart chip receives a transaction request, the smart chip executes a transaction procedure according to the ID verification information. The smart chip sends a processing result of the transaction procedure to the processing unit.

The present disclosure also provides a mobile communication device, in which the mobile communication device performs ID check and data verification process on a server through a smart chip. The mobile communication device comprises a wireless communication unit, a smart chip and a processing unit. The processing unit is electrically connected to the smart chip and the wireless communication unit. When the processing unit runs a transaction procedure, the processing unit obtains ID verification information from the smart chip. The processing unit drives the wireless communication unit to send the ID verification information to the server and requests the server to perform an ID verification procedure to determine whether the transaction procedure is valid. When the transaction procedure is invalid, the processing unit cancels the transaction procedure.

In addition to the above implementation aspects, the present disclosure provides a data verification system comprising a mobile communication device having a smart chip. The data verification system is applicable to data verification process in a transaction process of the mobile communication device and a server.

The data verification system of the present disclosure comprises a front end access device and the mobile communication device. The mobile communication device further comprises a wireless communication unit, the smart chip, and a processing unit.

The processing unit is electrically connected to the smart chip and the wireless communication unit. When the smart chip receives a transaction request from the front end access device, the processing unit obtains the ID verification information from the smart chip. The processing unit executes a transaction procedure and obtains the ID verification information from the smart chip. Then, the processing unit drives the wireless communication unit to send the ID verification information to the server and requests the server to perform an ID verification procedure to determine whether the transaction procedure is valid. When the transaction procedure is invalid, the processing unit cancels the transaction procedure.

The present disclosure provides a double chips smart card, where the smart card comprises a first chip, a second chip and a receiving hole. The smart card of the present disclosure has a first side and a second side. The first chip is disposed in a first position on the first side of the smart card. The first chip is electrically connected to an antenna. The receiving hole is disposed in a second position on the second side of the smart card. The second chip is fixed inside the receiving hole.

The present disclosure further provides a mobile communication device based on the double chips smart card. The mobile communication device performs validity determination of a transaction procedure through ID verification information in the second chip. The mobile communication device comprises a wireless communication unit and a processing unit.

The processing unit is electrically connected to the smart chip and the wireless communication unit. When the second chip receives a transaction request from a front end access device, the processing unit obtains the ID verification information from the second chip and executes a transaction procedure. The processing unit obtains the ID verification information from the second chip, and the processing unit drives the wireless communication unit to send the ID verification information to the server and requests the server to perform an ID verification procedure to determine whether the transaction procedure is valid. When the transaction procedure is invalid, the processing unit cancels the transaction procedure.

The present disclosure provides a mobile communication device capable of combining with the smart card without changing the original structure of the mobile communication device. Moreover, the present disclosure further combines a transaction certification mechanism of the smart card and the financial institution. A user can confirm the transaction contents through the mobile communication device each time transaction occurs, and the financial institution can confirm an ID of the user performing the transaction in time.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
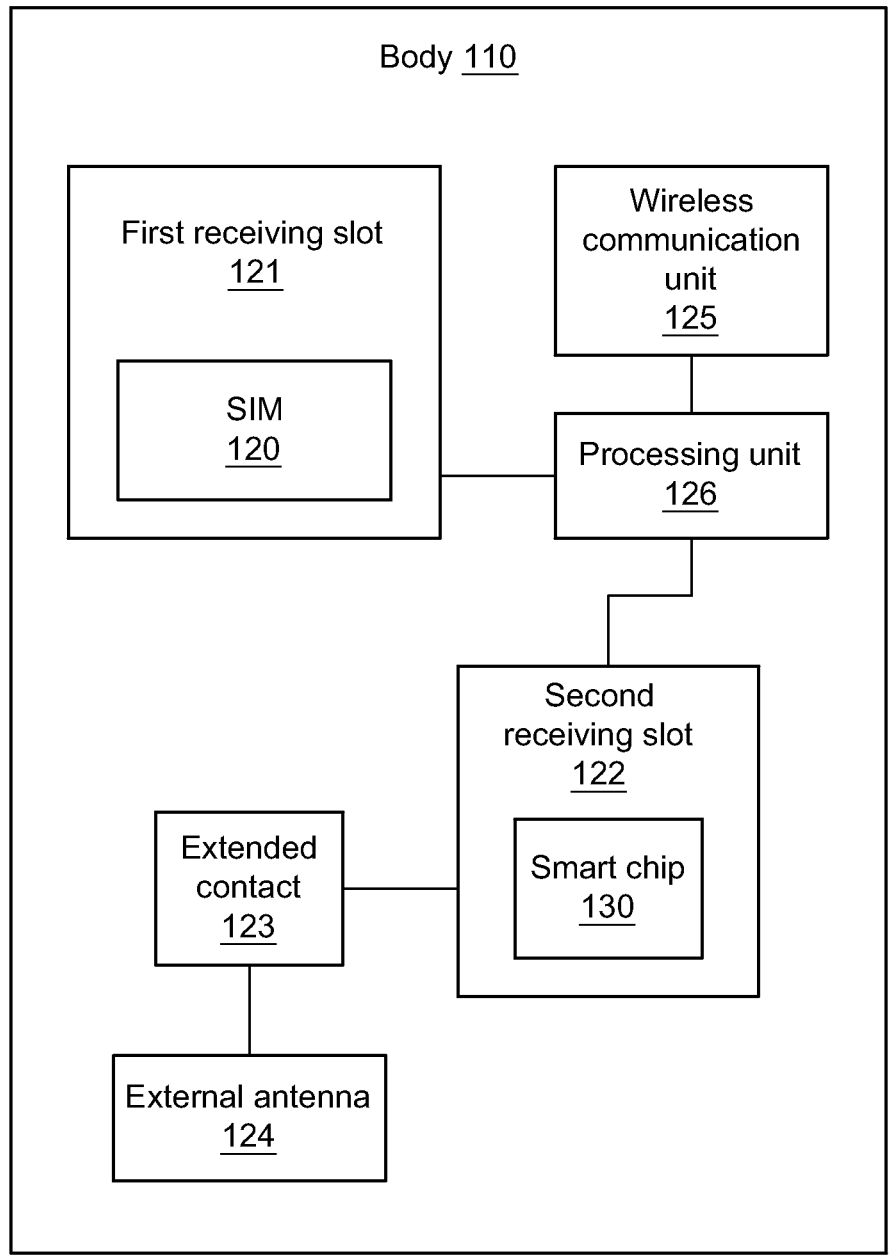
FIG. 1 is a schematic exploded view of a mobile communication device according to the present disclosure.

The present disclosure is applied to a mobile communication device. In addition to being a mobile phone, the mobile communication device may also be an electronic device such as a personal digit assistant (PDA) or a tablet personal computer. The mobile communication device comprises a mobile communication device body (called a body 110 for short hereafter), a subscriber identity module (SIM) 120, a first receiving slot 121, a second receiving slot 122, an extended contact 123, an external antenna 124, a wireless communication unit 125, a processing unit 126, and a smart chip 130. FIG. 1 is a schematic exploded view of a mobile communication device according to the present disclosure. Referring to FIG. 1, receiving space and contacts on the body 110 corresponds to a card size and pins specified by the SIM 120.

The first receiving slot 121 is used to store the SIM 120. The first receiving slot 121 further comprises at least one first group of contacts (the number of the contacts corresponds to the number of pins of the SIM 120). The second receiving slot 122 is used to receive the smart chip 130 and also comprises a second group of contacts. The second group of contacts is electrically connected to the extended contact 123 and the smart chip 130. The processing unit 126 is electrically connected to the first receiving slot 121, the second receiving slot 122, and the wireless communication unit 125 respectively. The wireless communication unit 125 may adopt IEEE 802.11 series wireless transmission, blue tooth wireless communication, or near field wireless communication. The processing unit 126 may access data of the SIM 120 and the smart chip 130 through the contacts and is used to execute a transaction procedure or perform corresponding data verification processing.

Figure 2A:
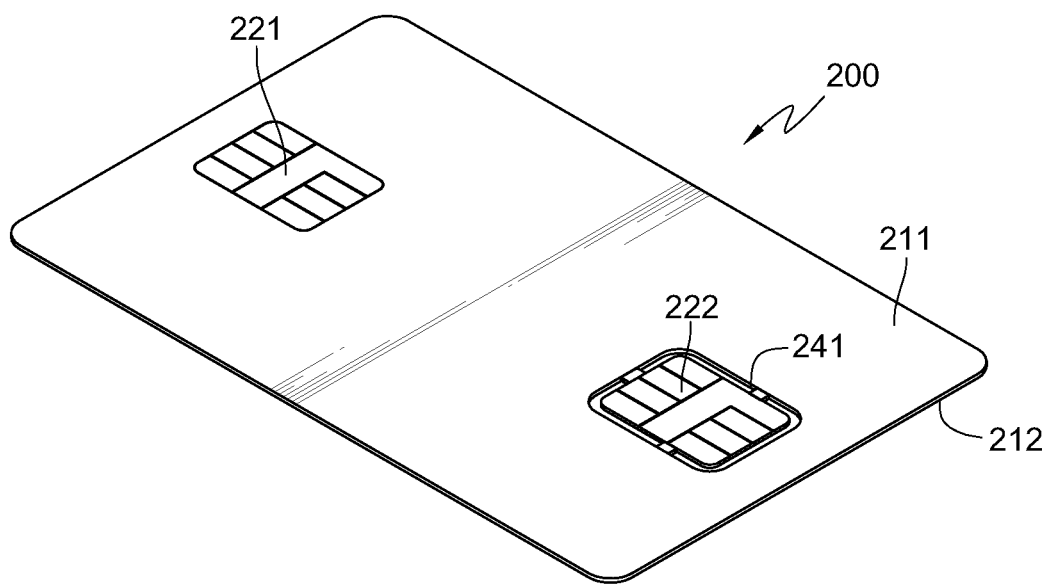
FIG. 2A is a schematic structural view of a smart card according to the present disclosure.
Figure 2B:
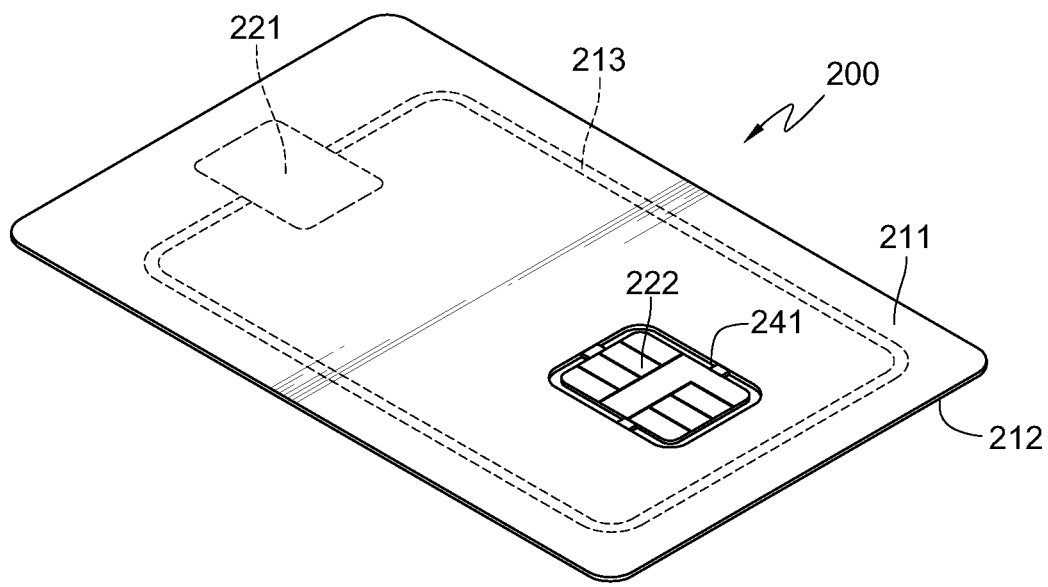
FIG. 2B is a schematic structural view of a smart card according to another aspect of the present disclosure.

The smart chip 130 may be a contactless smart chip or a contact smart chip, such as, an ATM card, a credit card, an E-wallet issued by a bank, or an E-ticket issued by a public transportation company. FIG. 2A is a schematic structural view of a smart card according to the present disclosure. Two opposite sides of the smart card 200 of the present disclosure each comprise a smart chip. For the convenience of description, the two sides of the smart card 200 are defined as a first side 211 and a second side 212 respectively. A first smart chip 221 and a second smart chip 222 are disposed in the first side 211 and the second side 212 respectively. The first smart chip 221 is connected to an antenna 213 of the smart card 200. The first smart chip 221 and the antenna 213 are configured according to ISO/IEC 7810 and ISO/IEC 7816. The second side 212 further comprises a receiving hole 241 with the second smart chip 222 disposed inside. The second smart chip 222 may be fixed in the receiving hole 241 through adhesion or in other manners. When a user obtains the smart card 200 having such structure, the user may take out the second smart chip 222, which is the smart chip 130 mentioned above. In addition, the smart card of the present disclosure may also be applied to a smart card with a smart chip and an antenna 213 embedded, as shown in FIG. 2B.

The smart chip 130 has an operation unit (unlabeled), a storage unit (unlabeled) and transmission pins (unlabeled). The operation unit is electrically connected to the storage unit and a transmission unit. The operation unit is used to execute a card operating system in the storage unit. The smart chip 130 is generally divided into eight connection regions that comprise a transmission pin connected to a power source, a reset pin, a clock pin, a ground pin, an I/O pin and reserve regions. The smart chip 130 stores ID verification information, and the ID verification information may be, but not limited to, various verification information such as a fabrication key, a public profile or a personal certification number.

The smart chip 130 is connected to the external antenna 124 through the extended contact 123, and the external antenna 124 is configured in the body 110 (or a back cover of the mobile communication device) according to ISO/IEC 7810 and ISO/IEC 7816. The type of the external antenna 124 may be, but not limited to, a flexible antenna (for example, a thin film antenna). Development manufacturer may alter the position of the external antenna 124 according to different mobile communication devices.

Figure 3A:
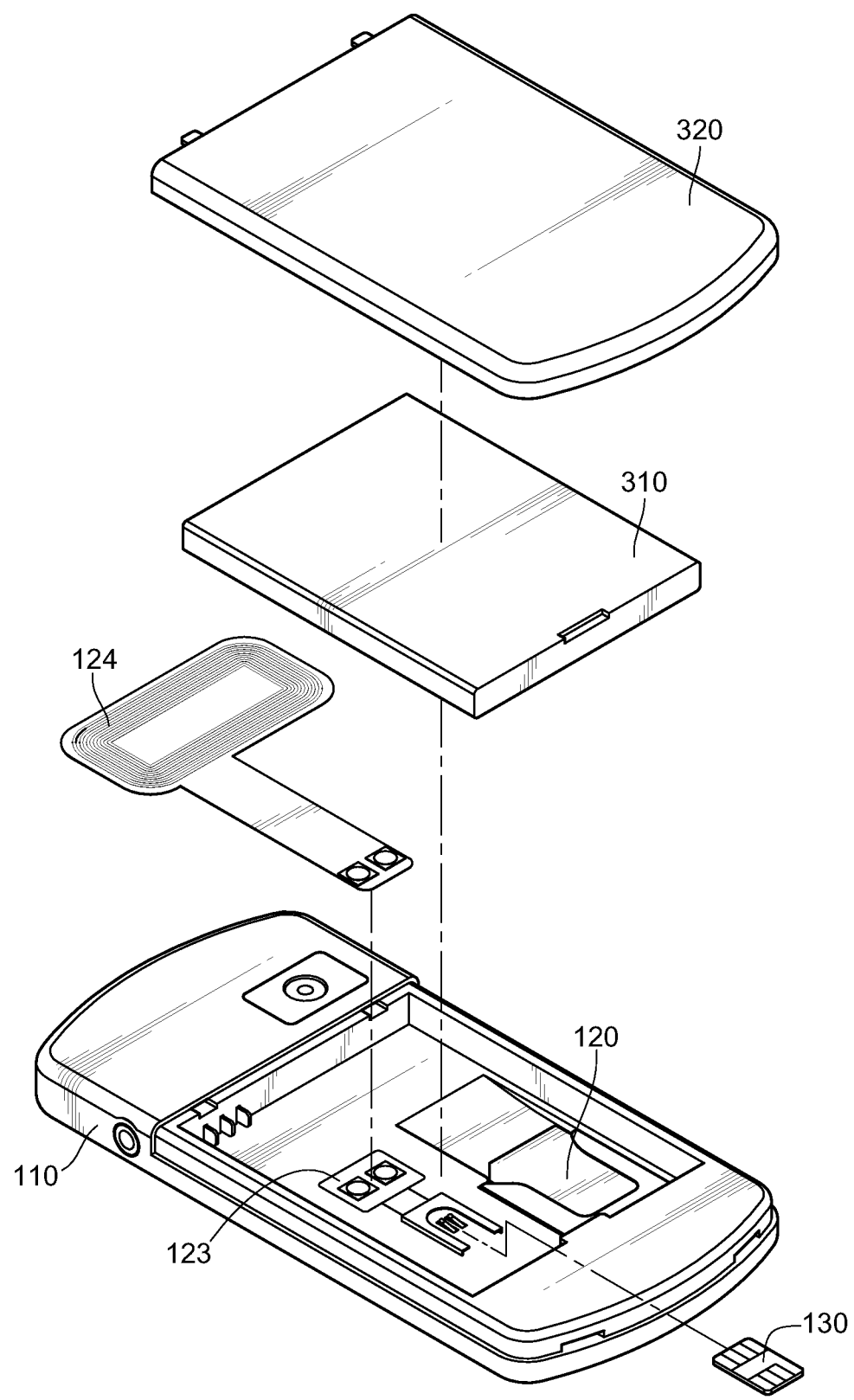
FIG. 3A is an exploded view of a subscriber identity module (SIM) according to the present disclosure.
Figure 3B:
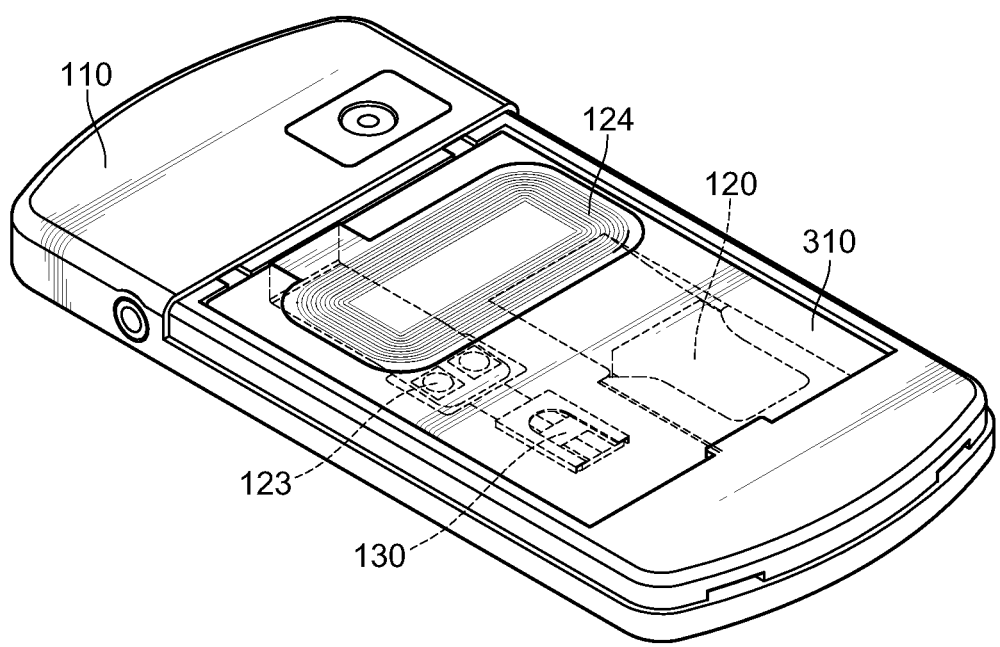
FIG. 3B is a schematic assembly view of the SIM according to the present disclosure.

FIG. 3A is taken as example for description. The SIM 120 is covered by a battery. To install the SIM 120 of the present disclosure in the mobile communication device, the extended contact 123 and the external antenna 124 may be bent outward, and then covers the battery 310 above the SIM 120. At this time, the extended contact 123 and the external antenna 124 are exposed in one side of the battery 310. The user may bend the external antenna 124 to an appropriate area, as shown in FIG. 3B.

Figure 4:
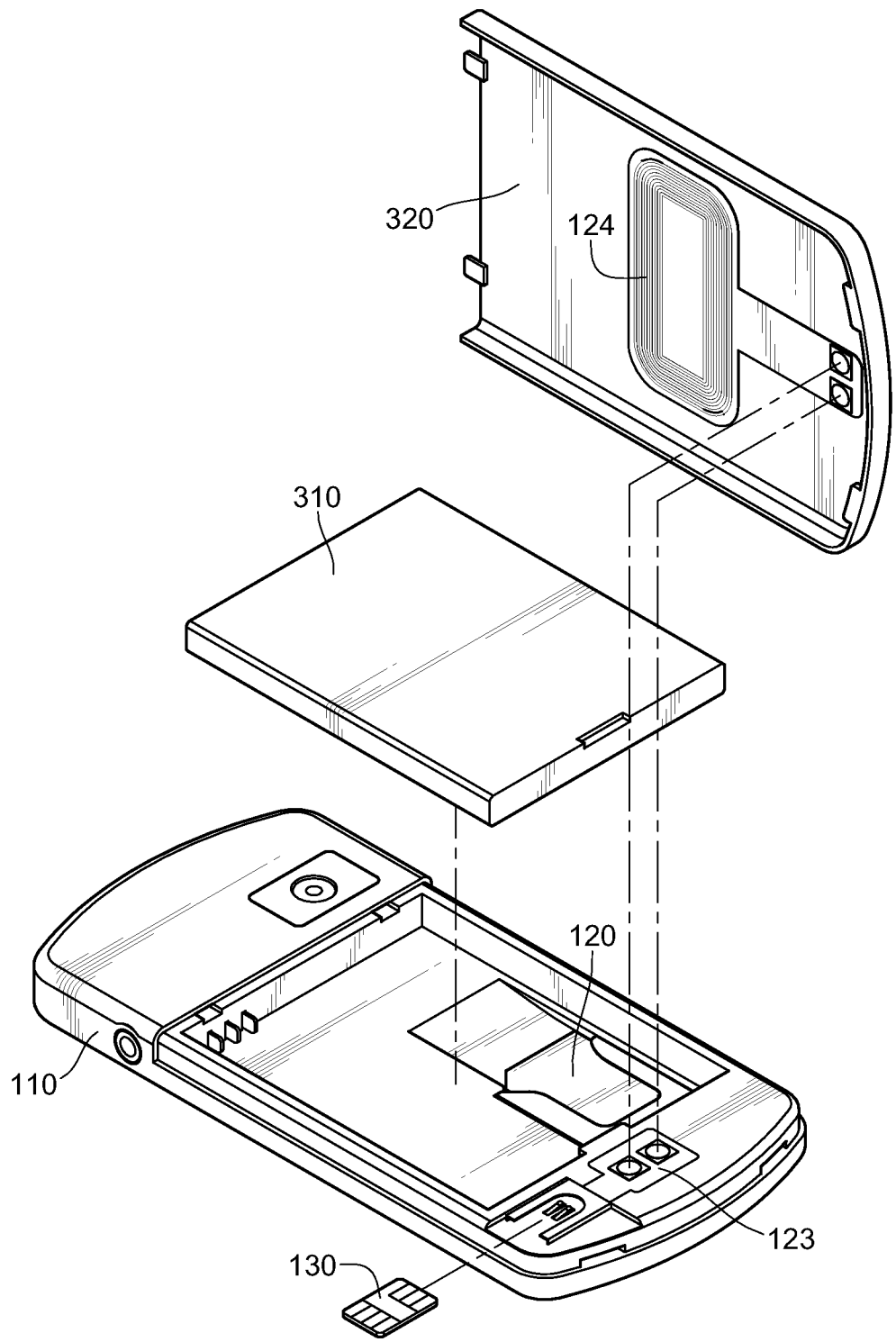
FIG. 4 is a schematic view of an implementation aspect of another SIM according to the present disclosure.

Alternatively, the external antenna 124 is disposed between the back cover 320 of the body 110 and a side of the body 110. When the body 110 and the back cover 320 are combined, the extended contact 123 may be electrically connected to the external antenna 124, as shown in FIG. 4. When the external antenna 124 and the card reader are close to each other, power is generated when the external antenna 124 is moved into the magnetic field emitted from the card reader. Therefore, the external antenna 124 may generate the power to provide the operation of the smart chip 130.

In addition to the proposed disposition manner of the smart chip 130, the present disclosure may further be applied to the data verification process such as bank business, transaction or certification based on this manner. The mobile communication device and the back end verification of the present disclosure are described below.

Figure 5:
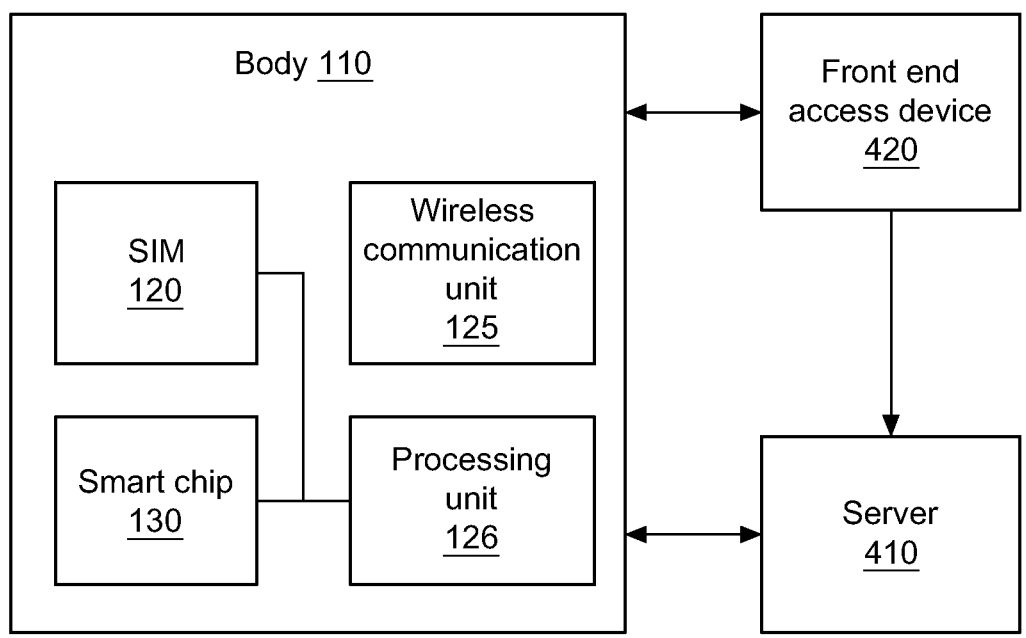
FIG. 5 is a data verification system according to the present disclosure.
Figure 6:
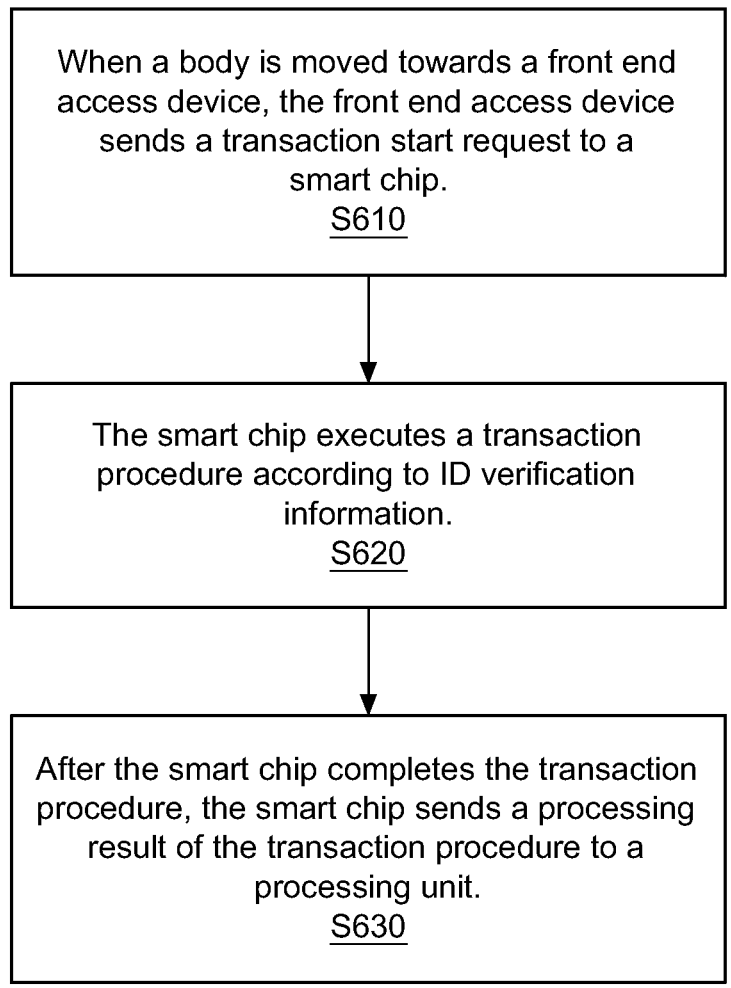
FIG. 6 is an operation flow of such an implementation aspect according to the present disclosure.

A data verification system of the present disclosure comprises a body 110, a server 410 and a front end access device 420, as shown in FIG. 5. The server 410 may be a financial institution (for example, a bank or a securities dealer), a telecom operator, a network service provider, or a combination thereof. The front end access device 420 is electrically connected to the server 410, and the front end access device 420 may be, but not limited to, a contactless card reader or a hybrid card reader. In order to illustrate an operation flow of such an embodiment of the present disclosure clearly, reference may be made to FIG. 6.

In Step S610, when a body is moved towards a front end access device, the front end access device sends a transaction request to a smart chip.

In Step S620, the smart chip executes a transaction procedure according to ID verification information.

In Step S630, after the smart chip completes the transaction procedure, the smart chip sends a processing result of the transaction procedure to a processing unit.

When the body 110 is moved towards the front end access device 420, the external antenna 124 provides the power for the operation of the smart chip 130. At the same time, the front end access device 420 sends the transaction request to the smart chip 130. The smart chip 130 receives the transaction request from the front end access device 420 and executes the transaction procedure according to the ID verification information. After the smart chip 130 completes the transaction procedure, the smart chip 130 sends the processing result of the transaction procedure to the processing unit and notifies a user the status of the current transaction procedure. For example, a development manufacturer may dispose an electronic purse (or other types of smart chips) in the mobile communication device. When the user moves the body 110 to be close to the front end access device 420, the smart chip 130 and the front end access device 420 perform the data process of money deduction or storage. After the data process is completed, the smart chip 130 sends a corresponding transaction result to the processing unit 126 to remind the user of whether the transaction is completed.

Figure 7:
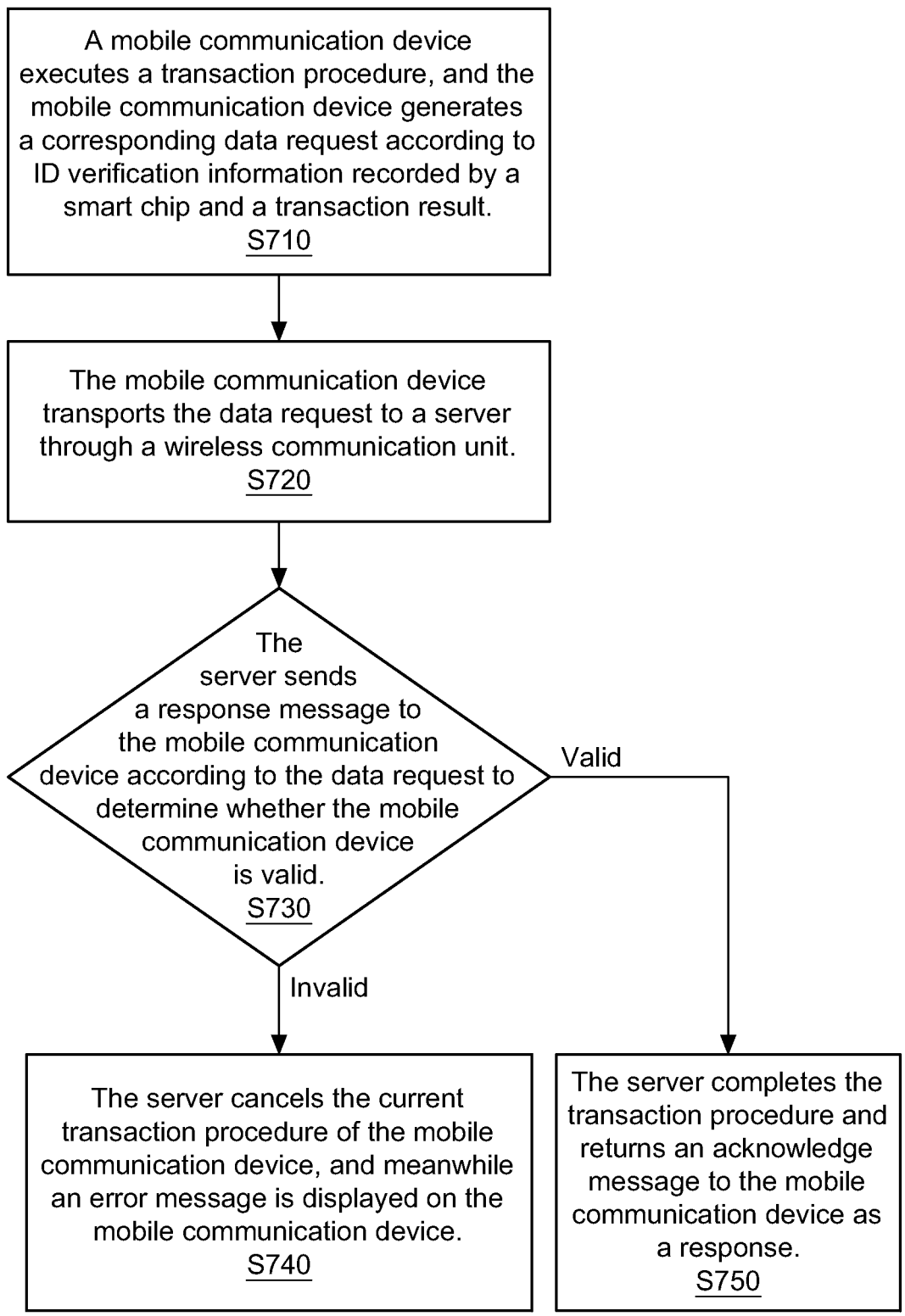
FIG. 7 is another schematic operation flow chart according to the present disclosure.

In addition, the present disclosure may also be applied to data verification processing of the transaction procedure on the mobile communication device. Generally, a relevant transaction application procedure, such as, a shopping procedure, a network bank or a data verification procedure, may be run on the mobile communication device. In such an embodiment of the present disclosure, the smart chip 130 is further employed to provide data verification during the transaction procedure. FIG. 7 is a schematic view of an operation flow. For a detailed operation flow of the embodiment, reference may be made to FIG. 7. The detailed operation flow comprises the following steps.

In Step S710, a mobile communication device executes a transaction procedure, and generates a corresponding data request according to ID verification information recorded by a smart chip and a transaction result.

In Step S720, the mobile communication device transports the data request to a server through a wireless communication unit.

In Step S730, the server sends a response message to the mobile communication device according to the data request to determine whether the mobile communication device is valid.

In Step S740, if the mobile communication device is invalid, the server cancels the current transaction procedure of the mobile communication device, and meanwhile an error message is displayed on the mobile communication device.

In Step S750, if the mobile communication device is valid, the server completes the transaction procedure and returns an acknowledge message to the mobile communication device as a response.

First, the transaction procedure (for example, network shopping) is run on the body 110. The body 110 accesses the ID verification information carried in the smart chip 130 during the transaction processing for paying bills or ID verification. The body 110 may be electrically connected to the smart chip 130 through the second group of contacts of the second receiving slot 122, so when the body 110 runs the above procedure, the processing unit 126 may directly access the ID verification information in the smart chip 130. The processing unit 126 drives the wireless communication unit 125 to send the ID verification information to the server 410.

Then, the server 410 executes an ID verification procedure according to the ID verification information to determine whether the mobile communication device is valid. For example, the server 410 may perform the ID verification according to a preset password set by a user or a dynamic password (or referred to as one time password) provided by the server 410. If the ID verification succeeds, the ID of the user is valid. If the ID verification fails, an ID of the user is invalid. If the mobile communication device is valid, the server 410 completes the transaction procedure and returns the acknowledge message to the mobile communication device as the response. If the mobile communication device is invalid, the server 410 cancels the current transaction procedure of the mobile communication device.

Figure 8:
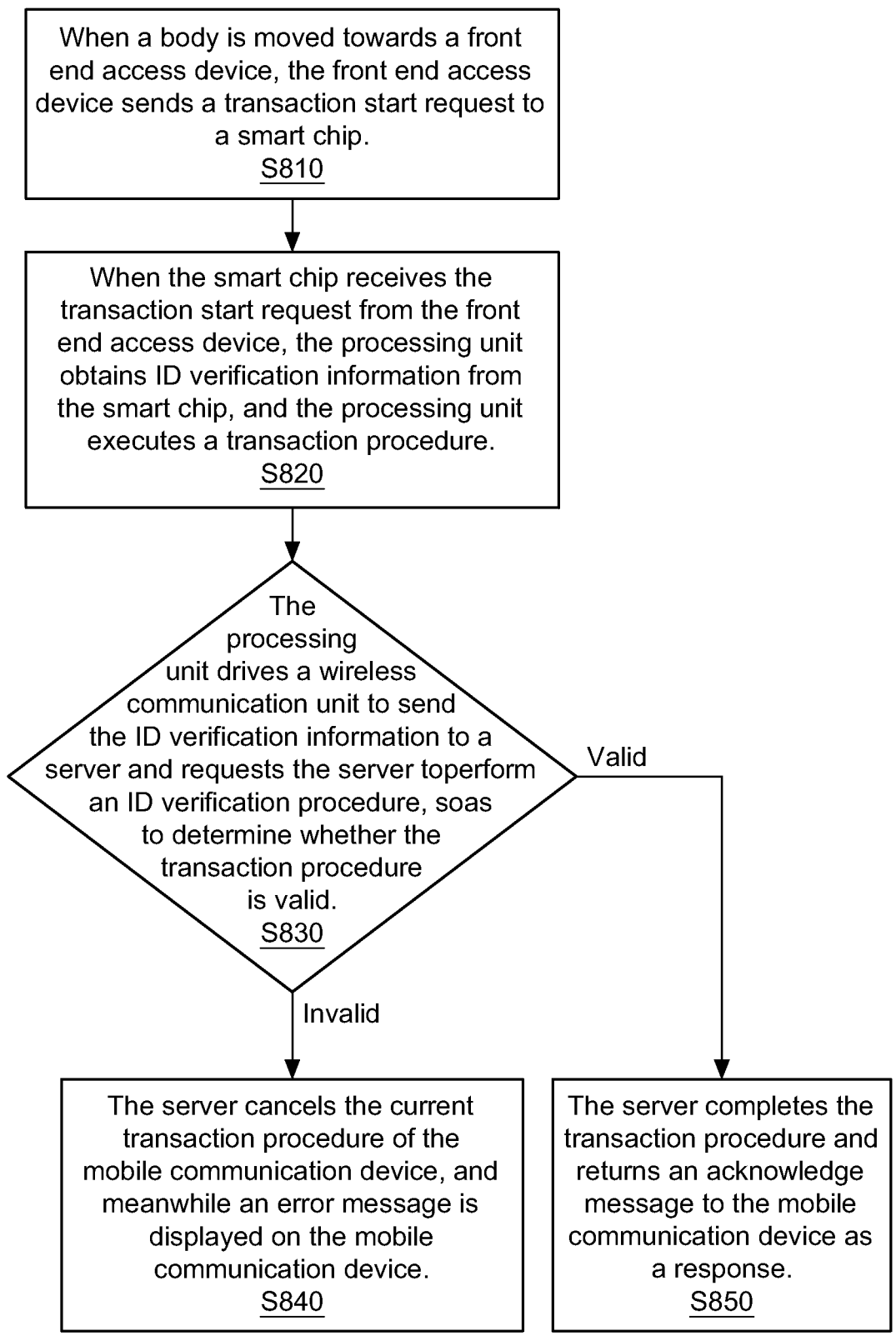
FIG. 8 is a schematic operation flow chart of such an implementation aspect according to the present disclosure.

In addition to the foregoing embodiments, the present disclosure further provides an embodiment of the combination of above embodiments. FIG. 8 is a schematic operation flow chart of such an implementation aspect according to the present disclosure. Referring to FIG. 8, the following steps are described.

In Step S810, when a body is moved towards a front end access device, the front end access device sends a transaction request to a smart chip.

In Step S820, when the smart chip receives transaction request the from the front end access device, the processing unit obtains ID verification information from the smart chip, and the processing unit execute a transaction procedure.

In Step S830, the processing unit drives a wireless communication unit to send the ID verification information to a server and requests the server to perform an ID verification procedure to determine whether the transaction procedure is valid.

In Step S840, if the mobile communication device is invalid, the server cancels the current transaction procedure of the mobile communication device, and meanwhile an error message is displayed on the mobile communication device.

In Step S850, if the mobile communication device is valid, the server completes the transaction procedure and returns an acknowledge message to the mobile communication device as a response.

In such embodiment, when the body 110 is moved towards the front end access device 420, the external antenna 124 provides the power for the operation of the smart chip 130. At the same time, the front end access device 420 sends the transaction request to the smart chip 130. The processing unit 126 accesses the ID verification information carried in the smart chip 130. Then, the processing unit 126 drives the wireless communication unit 125 to send the ID verification information to the server 410 and requests the server 410 to perform the ID verification procedure to determine whether the current transaction procedure is valid. If the mobile communication device is invalid, the server 410 cancels the current transaction procedure of the mobile communication device. If the mobile communication device is valid, the server 410 completes the transaction procedure and returns the acknowledge message to the mobile communication device as the response.

The smart card 200 in the above embodiments may operate and provide verification function without changing the original structure of the mobile communication device. Moreover, the present disclosure further combines the transaction certification mechanism of the smart card 200 and the financial institution, so that the user can confirm the transaction contents each time the transaction occurs while the financial institution confirms the ID of the user performing the transaction in time. Furthermore, through the smart card 200 having double chips according to the present disclosure, the financial institution (such as, the bank, the E-wallet publisher) does not need to change an existing manufacturing flow of the smart card 200, and the mobile communication device does not need to change its structure additionally. Therefore, for the financial institution and the development manufacturer of the mobile communication device, the purpose of the data verification may be achieved without additionally generating a new manufacturing flow.

What is claimed is:

1. A mobile communication device, operable to perform data verification processing when the mobile communication device drives an internal smart chip to perform transactions with a front end access device, the mobile communication device comprising:
    a first receiving slot storing a subscriber identity module (SIM);
    a second receiving slot storing a smart chip storing identity (ID) verification information, wherein both the first and second slots electrically connect both the SIM and smart chip to a processing unit; wherein when the smart chip receives a transaction request, the smart chip executes a transaction procedure according to the ID verification information and the smart chip sends a processing result of the transaction procedure to the processing unit;
    an external antenna located external to both the SIM and smartchip and within the mobile device and electrically connected to the smart chip; and
    at least one extended contact external to the second receiving slot and electrically connected to the second receiving slot, the extended contact connecting the external antenna with the smart chip;
    the external antenna further comprising
        a radiating part comprising at least one antenna coil operable for radio communication of the device;
        a feeding part electrically contacting the at least one extended contact; and
        a conducting part, connecting the radiating part and the feeding part;
        wherein the extended antenna, when installed under a battery of the mobile device overlaying the feeding part, conducting part, SIM, and extended contact, electrically connects the feeding part and extended contact; and
    wherein the conducting part is flexible such that after the installation of the extended antenna, the conducting part flexes enabling the radiating part to overlay at least a portion of the battery, conducting part, feeding part, and extended contact.

2. The mobile communication device according to claim 1, wherein the processing unit executes a corresponding attention procedure according to the processing result of the transaction procedure.

* * * * *